United States Patent
Nishimura

(10) Patent No.: US 11,177,523 B2
(45) Date of Patent: Nov. 16, 2021

(54) ENERGY STORAGE APPARATUS

(71) Applicants: Blue Energy Co., Ltd., Kyoto (JP); Honda Motor Co., Ltd., Tokyo (JP)

(72) Inventor: Yosuke Nishimura, Kyoto (JP)

(73) Assignee: BLUE ENERGY CO., LTD., Kyoto (JP)

( * ) Notice: Subject to any disclaimer, the term of this patent is extended or adjusted under 35 U.S.C. 154(b) by 21 days.

(21) Appl. No.: 16/125,126

(22) Filed: Sep. 7, 2018

(65) Prior Publication Data
US 2019/0081295 A1    Mar. 14, 2019

(30) Foreign Application Priority Data

Sep. 12, 2017  (JP) .............. JP2017-175054

(51) Int. Cl.
| | |
|---|---|
| H01M 50/00 | (2021.01) |
| H01M 50/20 | (2021.01) |
| H01M 10/6554 | (2014.01) |
| H01G 11/00 | (2013.01) |

(52) U.S. Cl.
CPC ............ H01M 50/20 (2021.01); H01G 11/00 (2013.01); H01M 10/6554 (2015.04)

(58) Field of Classification Search
None
See application file for complete search history.

(56) References Cited

U.S. PATENT DOCUMENTS

| 2014/0295227 A1 | 10/2014 | Aoki |
| 2015/0064546 A1 | 3/2015 | Murakami et al. |
| 2016/0036101 A1 | 2/2016 | Nishimura et al. |

FOREIGN PATENT DOCUMENTS

| JP | 2015-005356 A | 1/2015 |
| JP | 2015-050067 A | 3/2015 |
| JP | 2015-099648 A | 5/2015 |
| JP | 2016-031900 A | 3/2016 |
| JP | 2016-091871 A | 5/2016 |
| WO | WO 2013/073046 A1 | 4/2015 |

OTHER PUBLICATIONS

Full machine translation of JP 2015099648 A (Year: 2015).*

* cited by examiner

*Primary Examiner* — Milton I Cano
*Assistant Examiner* — Mary G Henshaw
(74) *Attorney, Agent, or Firm* — McGinn I.P. Law Group, PLLC

(57) ABSTRACT

Provided is an energy storage apparatus including: a neighboring member disposed adjacently to an energy storage device; and a terminal member disposed adjacently to the neighboring member on a side opposite to the energy storage device, wherein the terminal member has: a body extending along the neighboring member; and a bolt member having a head portion and a shaft portion extending from the head portion, and mounted on the body in a state where the shaft portion is made to pass through the body from a neighboring member side, the neighboring member has a protruding portion protruding in an axial direction of the shaft portion, and the protruding portion is inserted into the body at a position where at least a portion of the protruding portion overlaps with a projection region of the shaft portion in the axial direction.

20 Claims, 11 Drawing Sheets

ENERGY STORAGE APPARATUS

CROSS-REFERENCE TO RELATED APPLICATIONS

This application is based on Japanese Patent Application No. 2017-175054, filed on Sep. 12, 2017, the entire contents of which are hereby incorporated by reference.

FIELD

The present invention relates to an energy storage apparatus which includes a neighboring member disposed adjacently to an energy storage device, and a terminal member disposed adjacently to the neighboring member.

BACKGROUND

Conventionally, there has been known an energy storage module where a pair of end plates is disposed on both end portions of stacked energy storage cells in a stacking direction (see JP 2015-99648 A).

To be more specific, this energy storage module includes a predetermined number of energy storage cells stacked in a stacking direction, and a pair of end plates overlapped to outer sides of the predetermined number of energy storage cells in the stacking direction. The pair of end plates is formed of; a first plate formed by applying press forming to a metal plate; and a second plate integrally overlapped with the first plate and formed of a flat metal plate. Two bolts are mounted on the second plate such that these bolts project outward in the stacking direction.

In the energy storage module having the above-mentioned configuration, when a force which acts about an axis of the bolt projecting from the second plate is applied to the bolt, a large force (torque) is applied to joined portions between the second plate and the first plate. In view of the above, the first plate and the second plate are integrally welded to each other in an overlapping state.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus which, when a force which acts about an axis of a shaft portion of a terminal member is applied to the shaft portion, can suppress a force applied to an engaging portion between the terminal member and a neighboring member disposed adjacently to the terminal member.

An energy storage apparatus according to an aspect of the present invention includes: a neighboring member disposed adjacently to an energy storage device; and a terminal member disposed adjacently to the neighboring member on a side opposite to the energy storage device, wherein the terminal member has: a body extending along the neighboring member; and a shaft portion protruding from the body toward a side opposite to the neighboring member, the neighboring member or the terminal member has a protruding portion protruding in an axial direction of the shaft portion, and the protruding portion is inserted into the body or the neighboring member at a position where at least a portion of the protruding portion overlaps with a projection region of the shaft portion in the axial direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
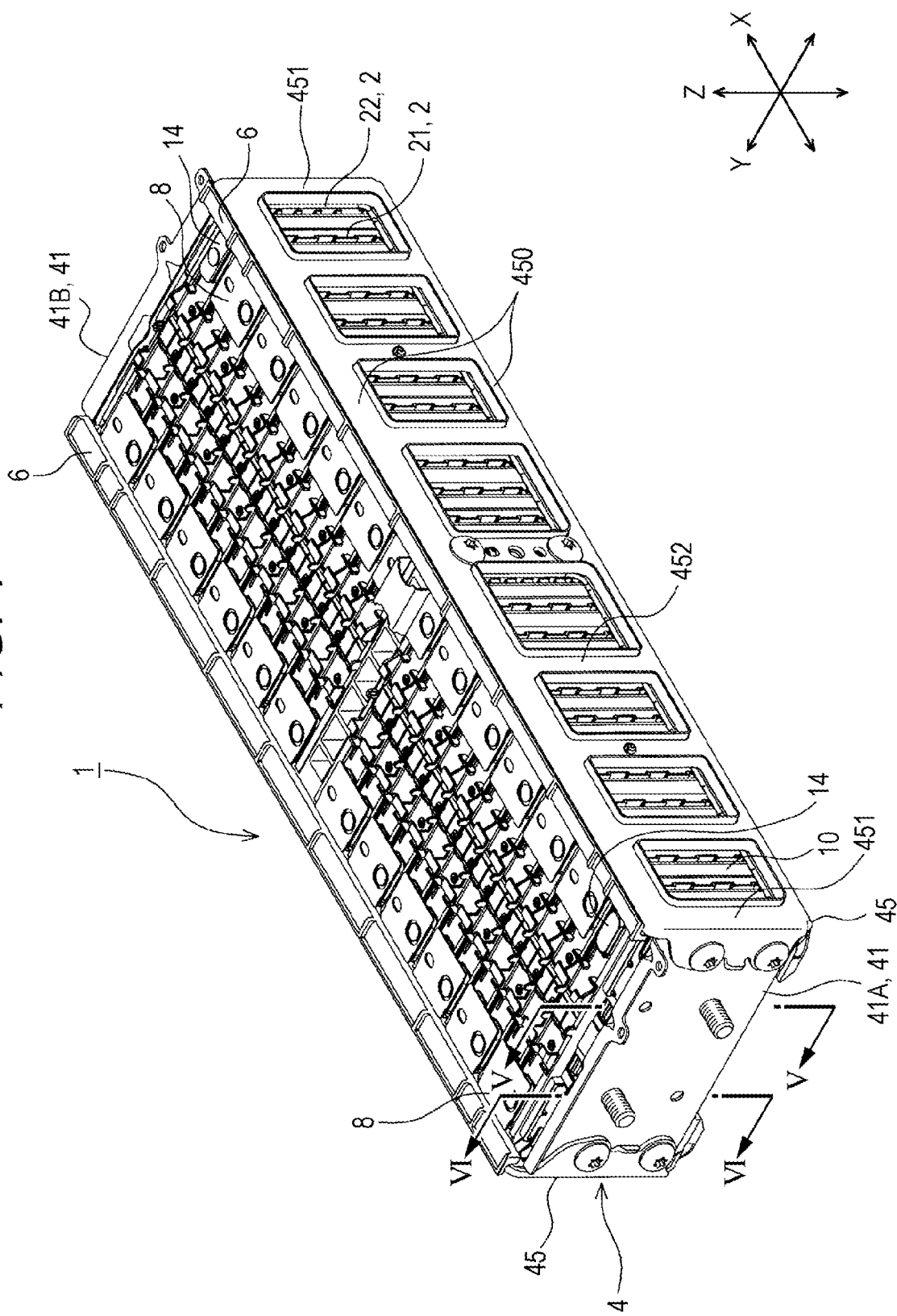
FIG. 1 is a perspective view showing an energy storage apparatus according to an embodiment of the present invention.

An energy storage apparatus according to an aspect of the present invention includes: a neighboring member disposed adjacently to an energy storage device; and a terminal member disposed adjacently to the neighboring member on a side opposite to the energy storage device, wherein the terminal member has: a body extending along the neighboring member; and a shaft portion protruding from the body toward a side opposite to the neighboring member, the neighboring member or the terminal member has a protruding portion protruding in an axial direction of the shaft portion, and the protruding portion is inserted into the body or the neighboring member at a position where at least a portion of the protruding portion overlaps with a projection region of the shaft portion in the axial direction.

When a force which acts about the axis of the shaft portion is applied to the shaft portion, the greater a distance from the shaft portion (axis) in a direction orthogonal to the axial direction, the greater a force (a force generated by the force which acts about the axis of the shaft portion such as a torque) applied to an engaging portion between the neighboring member and the terminal member (that is, the protruding portion of the neighboring member (or the protruding portion of the terminal member)) becomes. However, with the above-mentioned configuration, the protruding portion of the neighboring member (or the protruding portion of the terminal member) is inserted into the body of the terminal member (or the neighboring member) at the position where at least a portion of the protruding portion of the neighboring member (or the protruding portion of the terminal member) overlaps with the projection region of the shaft portion in the axial direction and hence, the distance (the distance from the shaft portion (axis) in the direction orthogonal to the axial direction) becomes sufficiently small. Accordingly, it is possible to suppress a force applied to the protruding portion when a force which acts about the axis of the shaft portion is applied to the shaft portion.

The energy storage apparatus may be configured such that the neighboring member has the protruding portion, and the body has: a first portion on which the shaft portion is mounted; and a second portion disposed in a spaced apart manner from the first portion in the axial direction in a region which overlaps with at least the shaft portion as viewed in the axial direction, and the second portion has a protruding portion insertion hole or a protruding portion insertion recessed portion into which the protruding portion is inserted.

With such a configuration, the body has the duplicate structure at least partially (in the region which overlaps with the shaft portion as viewed in the axial direction) and hence, a strength of the terminal member can be sufficiently ensured. Further, the protruding portion is inserted into the second portion disposed at the position different from the portion of the terminal member on which the shaft portion is mounted and hence, for example, it is unnecessary to form a recessed portion in a proximal portion (an end portion of a body side) or the like of the shaft portion and to insert the protruding portion of the neighboring member into the recessed portion. Accordingly, a shape or the like of the protruding portion can be set without receiving restriction on a shape or the like of the shaft portion. That is, it is possible to ensure a large degree of freedom in designing the shape or the like of the protruding portion.

The energy storage apparatus may include a bolt member having a head portion and the shaft portion extending from the head portion, and mounted on the first portion in a state where the shaft portion is made to pass through the body from a neighboring member side, wherein the second portion may be disposed in a spaced apart manner from the first portion in the axial direction such that the head portion is positioned between the first portion and the second portion.

In this manner, by providing a distance between the first portion and the second portion and by positioning the head portion of the bolt portion in the distance, the head portion of the bolt portion does not obstruct the arrangement of the neighboring member with respect to the terminal member.

As has been described above, according to the present invention, it is possible to provide the energy storage apparatus which, when a force which acts about the axis of the shaft portion of the terminal member is applied to the shaft portion, can suppress a force applied to the engaging portion between the terminal member and the neighboring member disposed adjacently to the terminal member.

Hereinafter, one embodiment of the present invention is described with reference to FIG. 1 to FIG. 10. Names of respective constitutional members (respective constitutional elements) of this embodiment are used only for this embodiment, and may differ from names of respective constitutional members (respective constitutional elements) used in BACKGROUND.

Figure 2:
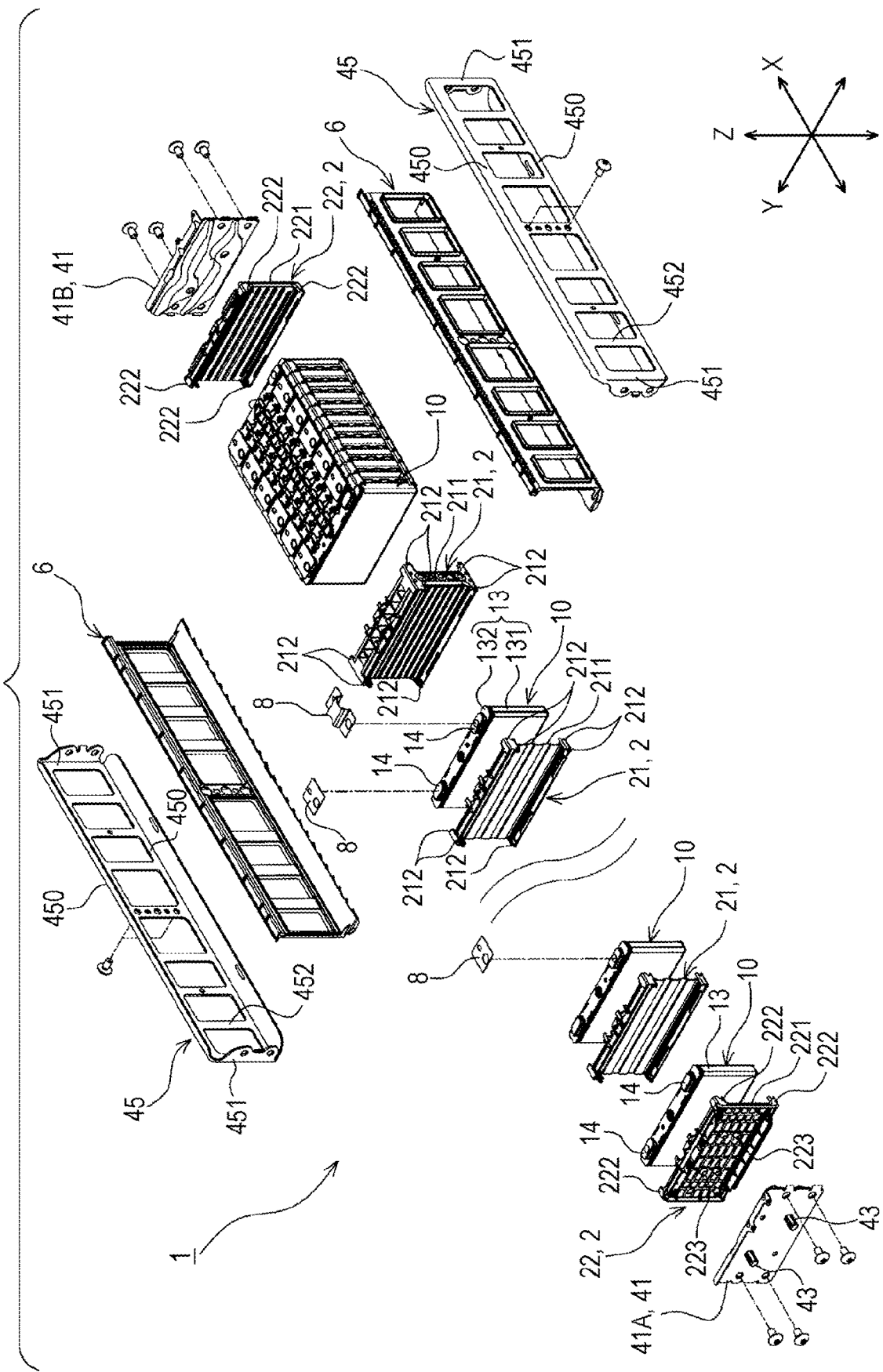
FIG. 2 is an exploded perspective view of the energy storage apparatus with a part omitted.

As shown in FIG. 1 and FIG. 2, an energy storage apparatus includes: energy storage devices 10; neighboring members 2 disposed adjacently to the energy storage devices 10 respectively; and a holder 4 which holds the energy storage devices 10 and the neighboring members 2. The energy storage apparatus 1 of this embodiment includes the plurality of energy storage devices 10 and the plurality of neighboring members 2, and the holder 4 collectively holds the plurality of energy storage devices 10 and the plurality of neighboring members 2. The energy storage apparatus 1 also includes insulators 6 which are disposed between the energy storage devices 10 and the holder 4, and bus bars 8 which connect the different energy storage devices 10 to each other in a conductive manner.

The plurality of energy storage devices 10 are arranged in a predetermined direction (X axis direction). Each of the plurality of energy storage devices 10 is a primary battery, a secondary battery, a capacitor or the like. The energy storage device 10 of this embodiment is a nonaqueous electrolyte secondary battery which can charge electricity and discharge electricity. To be more specific, the energy storage device 10 is a lithium ion secondary battery which makes use of the movement of electrons caused by the movement of lithium ions.

The energy storage device 10 includes: an electrode assembly; a case 13 which accommodates the electrode assembly together with an electrolyte solution; external terminals 14 where at least a portion of each external terminal 14 is exposed to the outside of the case 13; and current collectors which connect the electrode assembly and the external terminals 14 to each other.

In the electrode assembly, a positive electrode and a negative electrode are alternately stacked to each other with a separator interposed between the positive electrode and the negative electrode. In this electrode assembly, lithium ions move between the positive electrode and the negative electrode and hence, the energy storage device 10 can charge or discharge electricity.

The case 13 has: a case body 131 having an opening; and a plate-like lid plate 132 which closes (shuts) the opening of the case body 131. The case body 131 of this embodiment has a bottomed angular cylindrical shape, and the case 13 has a rectangular parallelepiped shape (hexahedron shape). The case 13 of this embodiment has a flat rectangular parallelepiped shape, and the plurality of energy storage devices 10 are arranged in the X axis direction in a state where wide surfaces (wall portions) of the cases 13 (case bodies 131) face each other.

Hereinafter, a direction that the plurality of energy storage devices 10 are arranged parallel to each other is assumed to as an X axis in orthogonal coordinates, a direction that a pair of narrow surfaces (wall portions) of the case bodies 131 is disposed oppositely to each other is assumed as Y axis in orthogonal coordinates, and a normal direction of the lid plate 132 is assumed as a Z axis of the orthogonal coordinates.

As shown in FIG. 1 and FIG. 2, the neighboring member 2 is disposed between the energy storage devices 10 disposed adjacently to each other in the X axis direction, or between the energy storage device 10 and a member disposed adjacently to the energy storage device 10 in the X axis direction (a portion of the holder 4 in an example of this embodiment). The neighboring members 2 include plural kinds of neighboring members. The neighboring member 2 of this embodiment includes: intermediate neighboring members 21 each of which is disposed adjacently to the energy storage device 10 disposed at an intermediate position in the X axis direction; and terminal neighboring members (neighboring members) 22 each of which is disposed outside the energy storage device 10 disposed at an outermost end in the X axis direction and is disposed adjacently to such an energy storage device 10. The intermediate neighboring member 21 is disposed between the respective energy storage devices 10. That is, the energy storage apparatus 1 has the plurality of intermediate neighboring members 21. Further, each terminal neighboring member 22 is disposed outside the energy storage device 10 which is disposed on an outermost end in the X axis direction. That is, the energy storage apparatus 1 includes the pair of terminal neighboring members 22.

Each of the plurality of intermediate neighboring members 21 has an insulating property, and is disposed between two energy storage devices 10 disposed adjacently to each other in the X axis direction. Due to the provision of the intermediate neighboring member 21, a predetermined distance (a creepage distance or the like) is ensured between two energy storage devices 10 which are disposed adjacently to each other in the X axis direction.

To be more specific, the intermediate neighboring member 21 has: a plate-like first body portion 211 positioned between two energy storage devices 10 disposed adjacently to each other in the X axis direction; and first restricting portions 212 which restrict the movement of the energy storage devices 10 disposed adjacently to the first body portion 211 with respect to the first body portion 211.

The first body portion 211 is a portion facing wide surfaces of the cases 13 of the energy storage devices 10 and expanding in a Y-Z plane (a plane including a Y axis and a Z axis). The first body portion 211 of this embodiment forms flow passages which allow a temperature regulating fluid (air in an example of this embodiment) to pass therethrough between the first body portion 211 and the energy storage devices 10 disposed adjacently to the first body portion 211.

The first restricting portions 212 extend in the X axis direction from the first body portion 211, and are brought into contact with the energy storage devices 10 (to be more specific, the cases 13) disposed adjacently to the first body portion 211 from the outside in the Y-Z plane direction thus restricting the movement of the energy storage devices 10 in the Y-Z plane direction relative to the first body portion 211. The first restricting portions 212 of this embodiment respectively extend toward both sides in the X axis direction from the first body portion 211.

Each of the pair of terminal neighboring members 22 has an insulating property and is disposed between the energy storage device 10 and the holder 4 (terminal member 41) disposed adjacently to each other in the X axis direction. Due to the provision of the terminal neighboring member 22, a predetermined distance (creepage distance or the like) can be ensured between the energy storage device 10 and the holder 4 (terminal member 41). In this embodiment, the pair of terminal neighboring members 22 has the same shape.

Figure 3:
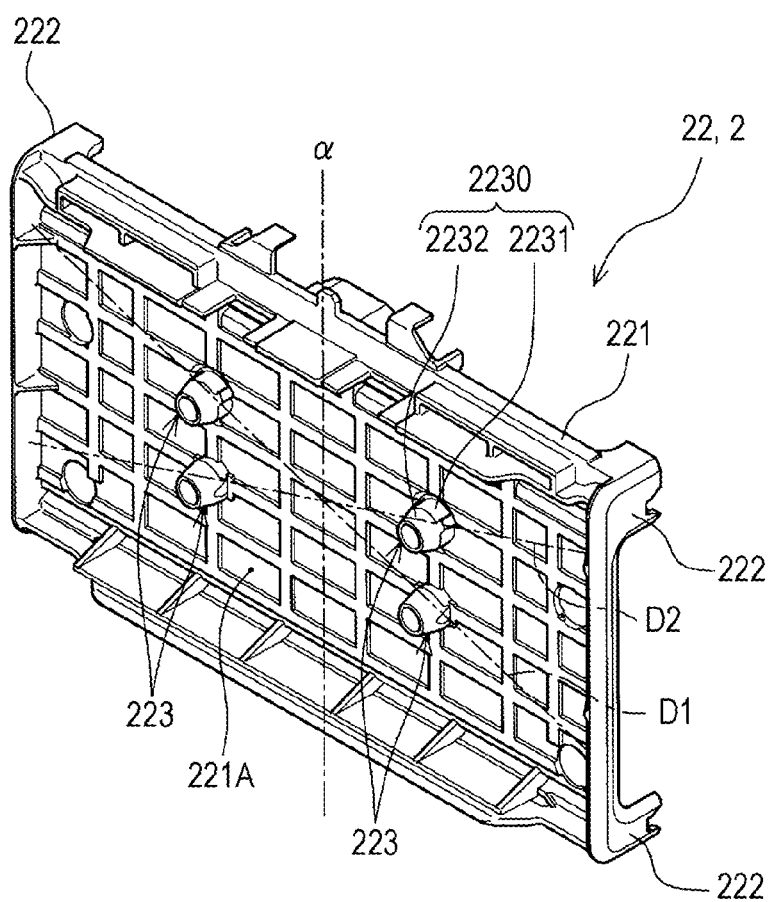
FIG. 3 is a perspective view of a terminal neighboring member of the energy storage apparatus.
Figure 3:
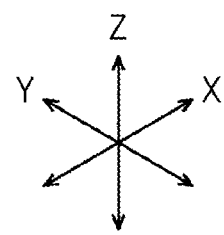
Figure 4:
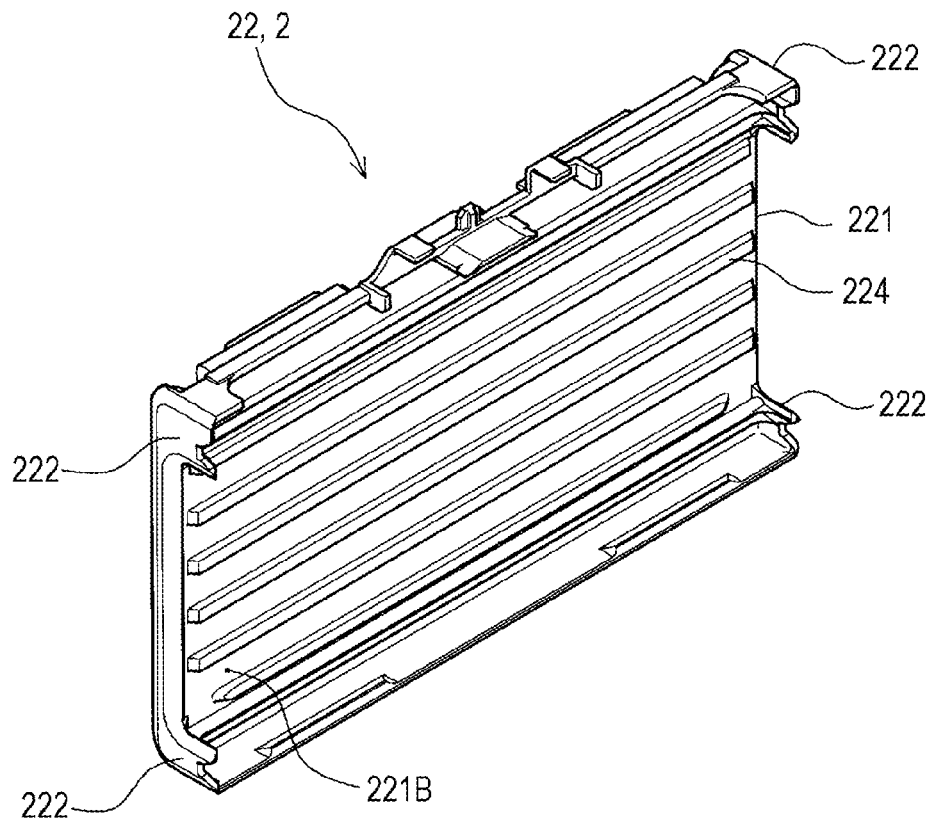
FIG. 4 is a perspective view of the terminal neighboring member.
Figure 4:
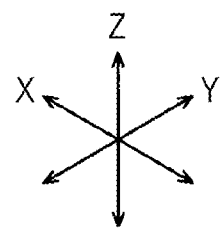

To be more specific, as shown also in FIG. 3 and FIG. 4, the terminal neighboring member 22 has: a second body portion 221 which is disposed adjacently to the energy storage device 10 between the energy storage device 10 and the holder 4; and second restricting portions 222 which restrict the movement of the energy storage device 10 with respect to the second body portion 221.

The second body portion 221 is a portion which faces a wide surface of the case 13 of the energy storage device 10 disposed on an end portion in the X axis direction, and is a plate-like portion expanding in the Y-Z plane direction. A profile of the second body portion 221 corresponds to a profile of the case 13 of the energy storage device 10. That is, the second body portion 221 has a rectangular shape elongated in the Y axis direction as viewed in the X axis direction.

The second body portion 221 has, on a surface (outer surface) 221A directed toward a terminal member 41 side, at least one protruding portion 223 which protrudes in the X axis direction from the outer surface 221A. As shown also in FIG. 5 and FIG. 6, the protruding portion 223 has a bottomed cylindrical shape. The protruding portion 223 has a peripheral surface 2230 formed of a proximal portion 2231 having an approximately circular columnar surface; and a tapered portion 2232 whose diameter is gradually decreased from the proximal portion 2231 toward a distal end of the protruding portion 223. In this embodiment, the second body portion 221 has four protruding portions 223, and four protruding portions 223 have the same shape.

Four protruding portions 223 are disposed in line symmetry with respect to an imaginary line α extending in the Z axis direction at a center position of the outer surface 221A in the Y axis direction which is an axis of symmetry. Further, four protruding portions 223 are disposed on two respective imaginary straight lines (imaginary inclined lines D1, D2: see FIG. 3) intersecting with the imaginary line α at the same angle and intersecting with each other on the imaginary line α such that two protruding portions 223 are disposed on each imaginary straight line.

The second body portion 221 has a plurality of ridges 224 extending in the Y axis direction on a surface (inner surface) 221B thereof which is directed toward an energy storage device 10 side. The plurality of ridges 224 are arranged in a spaced apart manner in the Z axis direction. The second body portion 221 is disposed such that distal ends of the respective ridges 224 in the protruding direction (X axis direction) are brought into contact with the energy storage device 10 disposed adjacently to the second body portion 221 (terminal neighboring member 22). With such a configuration, flow passages which allow a temperature regulating fluid (air in an example of this embodiment) to pass therethrough are formed between the second body portion 221 and the energy storage device 10 disposed adjacently to the second body portion 221.

The second restricting portions 222 extend in the X axis direction from the second body portion 221, and are brought into contact with the energy storage device 10 (to be more specific, the case 13) disposed adjacently to the second body portion 221 from the outside in the Y-Z plane direction thus restricting the movement of the energy storage device 10 in the Y-Z plane direction relative to the second body portion 221. In this embodiment, the second restricting portions 222 respectively extend from the second body portion 221 toward one side (a side where the energy storage device 10 is disposed) in the X axis direction.

As shown in FIG. 1 and FIG. 2, the holder 4 surrounds the plurality of energy storage devices 10 and the plurality of neighboring members 2 thus collectively holding the plurality of energy storage devices 10 and the plurality of neighboring members 2. The holder 4 is formed of members made of a material having conductivity such as metal. To be more specific, the holder 4 includes: a pair of terminal members 41 which is disposed on both sides of a unit formed of the plurality of energy storage devices 10 in the X axis direction; and connecting members 45 which connect the pair of terminal members 41 to each other.

The pair of terminal members 41 is respectively disposed such that the terminal neighboring member 22 is sandwiched between the terminal member 41 and the energy storage device 10 disposed at an end in the X axis direction. As also shown in FIG. 7 to FIG. 10, with respect to the pair of terminal members 41, the shape of one terminal member 41A and the shape of the other terminal member 41B have a symmetrical relationship (a mirror image relationship).

The terminal member 41 has: a body 42 expanding along the terminal neighboring member 22; and bolt members 43 mounted on the body 42. In this embodiment, the terminal member 41 has two bolt members 43.

Each of two bolt members 43 has: a head portion 431; and a shaft portion 432 which extends from the head portion 431. The head portion 431 is larger than the shaft portion 432 in the Y-Z plane direction in size. That is, the diameter of the head portion 431 is larger than the diameter of the shaft portion 432. In this embodiment, the head portion 431 has a disc shape. The shaft portion 432 forms a male threaded portion extending in the X axis direction. The bolt members 43 are used for fixing the energy storage apparatus 1 at the time of mounting or installing the energy storage apparatus 1 on an object on which the energy storage apparatus 1 is scheduled to be mounted or installed. For example, when the energy storage apparatus 1 of this embodiment is mounted on an automobile, the bolt members 43 are used for fixing the energy storage apparatus 1 to the automobile at a mounting position.

In this embodiment, the body 42 is formed by overlapping two plate-like members (plate-like member and a concavo-convex-shaped member) to each other. To be more specific, the body 42 has: a first member (first portion) 421 which expands in the Y-Z plane direction and through which the shaft portions 432 of the bolt members 43 are made to pass; and a second member (second portion) 422 which is disposed in a spaced apart manner from the first member 421 in the X axis direction such that the head portions 431 are positioned between the second member 422 and the first member 421 in regions where the second member 422 overlaps with at least the head portions 431 of the bolt members 43 as viewed in the X axis direction.

The first member 421 has a flat plate shape expanding in the Y-Z plane direction. In this embodiment, the first member 421 is formed such that one end portion (on an upper side in FIG. 7 and FIG. 9) of the first member 421 in the Z axis direction is bent. A profile of the first member 421 corresponds to a profile of the case 13 of the energy storage device 10. That is, the first member 421 has a rectangular shape elongated in the Y axis direction as viewed in the X axis direction. The first member 421 has shaft portion insertion holes 421A which allow the shaft portions 432 of the bolt members 43 to pass therethrough (see FIG. 5 and FIG. 6). The shaft portion insertion holes 421A allow the passing of the shaft portion 432 of the bolt member 43 therethrough but do not allow the passing of the head portion 431 therethrough. That is, the diameter of the shaft portion insertion hole 421A is set larger than the diameter of the shaft portion 432 and is set smaller than the diameter of the head portion 431 in the Y-Z plane direction. The first member 421 of this embodiment has two shaft portion insertion holes 421A. These two shaft portion insertion holes 421A are disposed at positions which differ from each other in the Y axis direction and differ from each other in the Z axis direction (in the example shown in FIG. 7 and FIG. 9, at positions on a line corresponding to the imaginary inclined line D1 or D2 of the terminal neighboring member 22).

These two shaft portion insertion holes 421A are disposed at positions corresponding to the protruding portions 223 of the terminal neighboring member 22. For example, two shaft portion insertion holes 421A of one terminal member 41A are disposed at positions corresponding to two protruding portions 223 disposed on one imaginary inclined line D1 (see FIG. 3) of the second body portion 221, and two shaft portion insertion holes 421A of the other terminal member 41B are disposed at positions corresponding to two protruding portions 223 disposed on the other imaginary inclined line D2 (see FIG. 3) of the second body portion 221. That is, as shown in FIG. 7 to FIG. 10, the arrangement of two shaft portion insertion holes 421A formed in the first member 421 of one terminal member 41A and the arrangement of two shaft portion insertion holes 421A formed in the first member 421 of the other terminal member 41B have a symmetrical relationship (a mirror image relationship).

Figure 5:
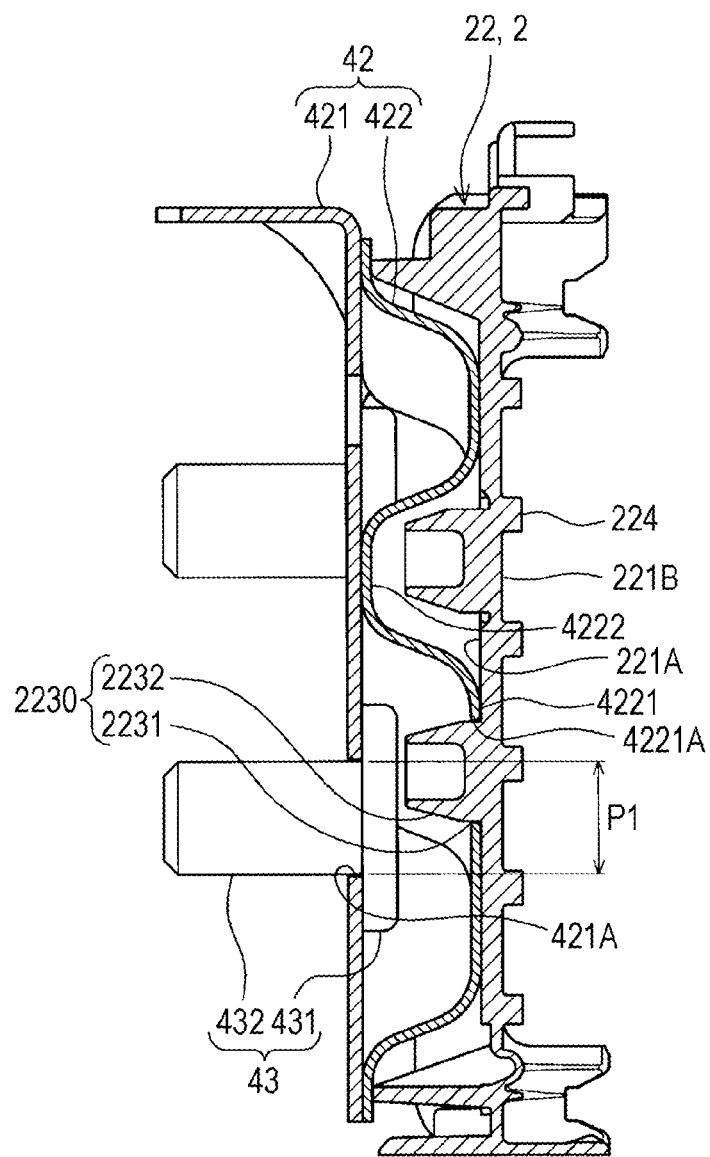
FIG. 5 is a cross-sectional view of a terminal member and the terminal neighboring member taken along a position V-V in FIG. 1.
Figure 6:
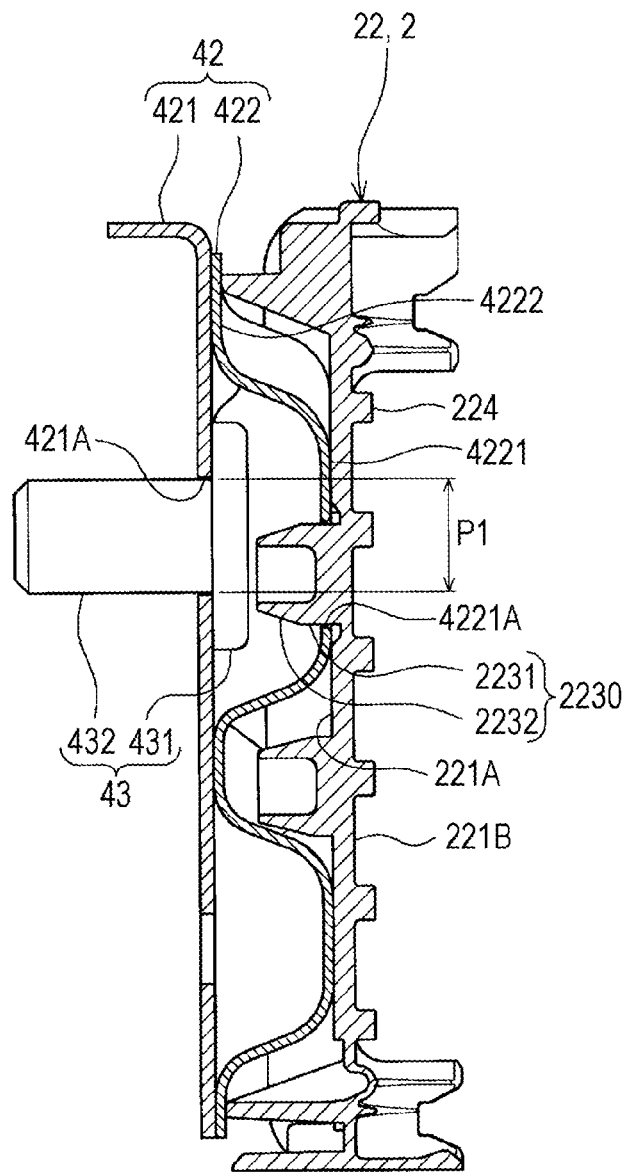
FIG. 6 is a cross-sectional view of the terminal member and the terminal neighboring member taken along a position VI-VI in FIG. 1.
Figure 7:
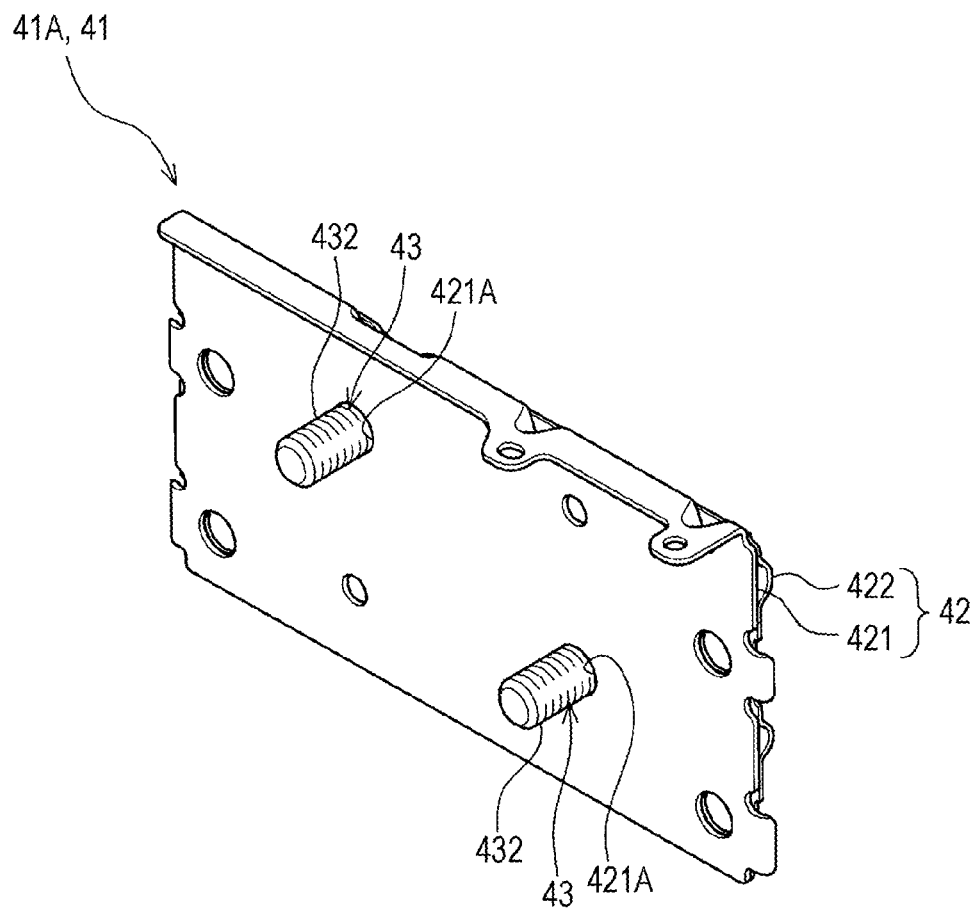
FIG. 7 is a perspective view of one terminal member out of a pair of terminal members.
Figure 8:
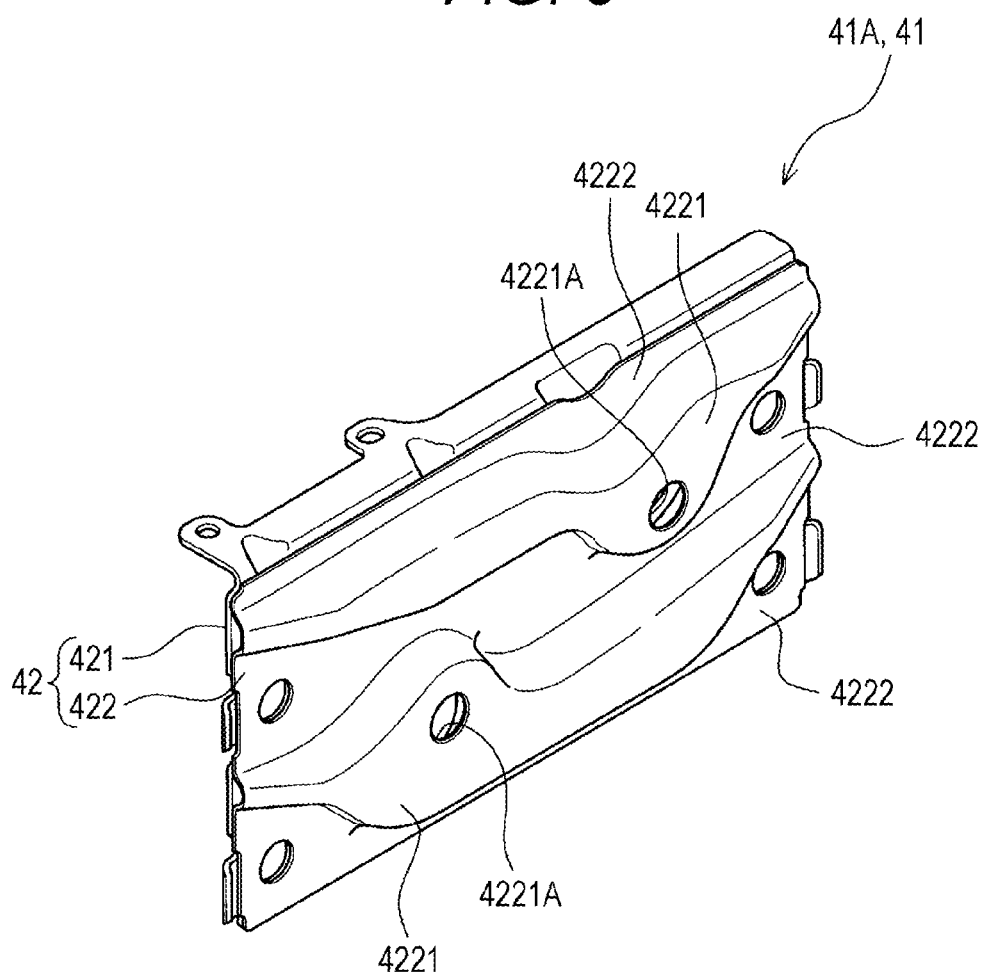
FIG. 8 is a perspective view of one terminal member.
Figure 8:
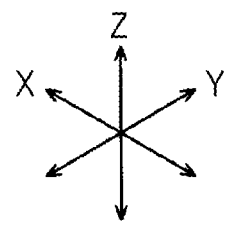
Figure 9:
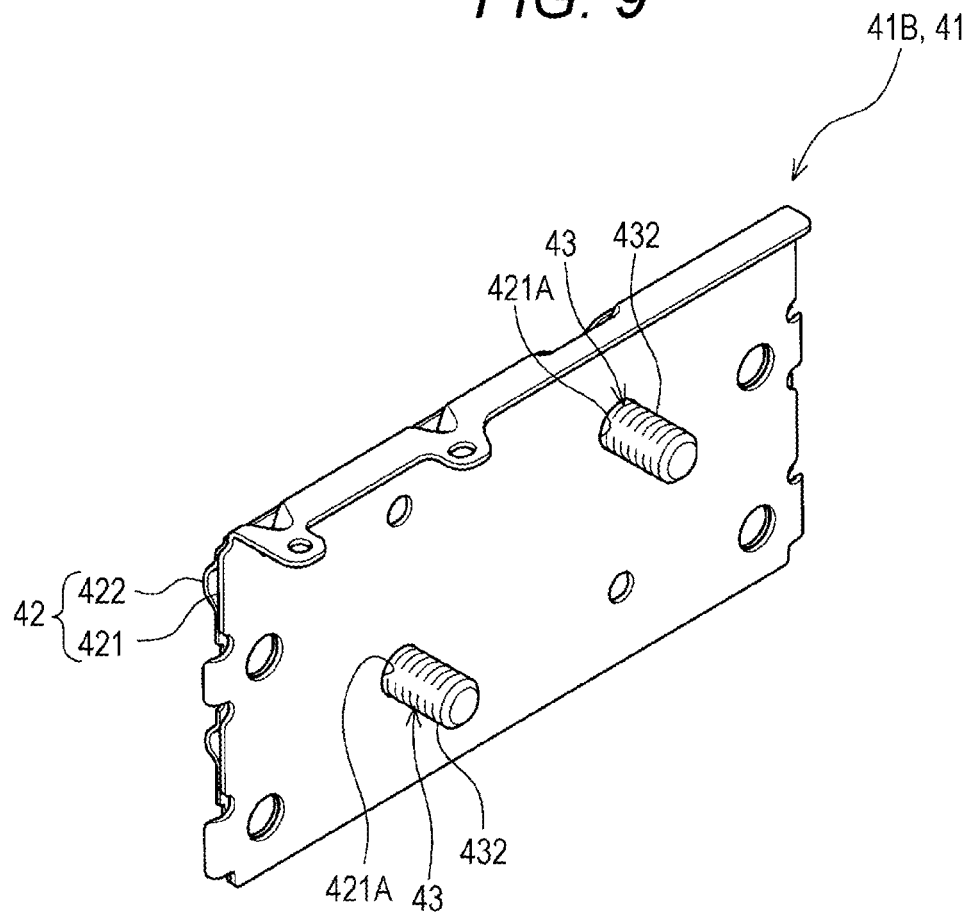
FIG. 9 is a perspective view of the other terminal member out of the pair of terminal members.
Figure 9:
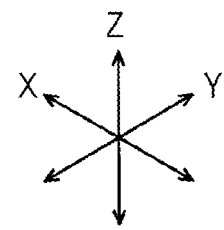
Figure 10:
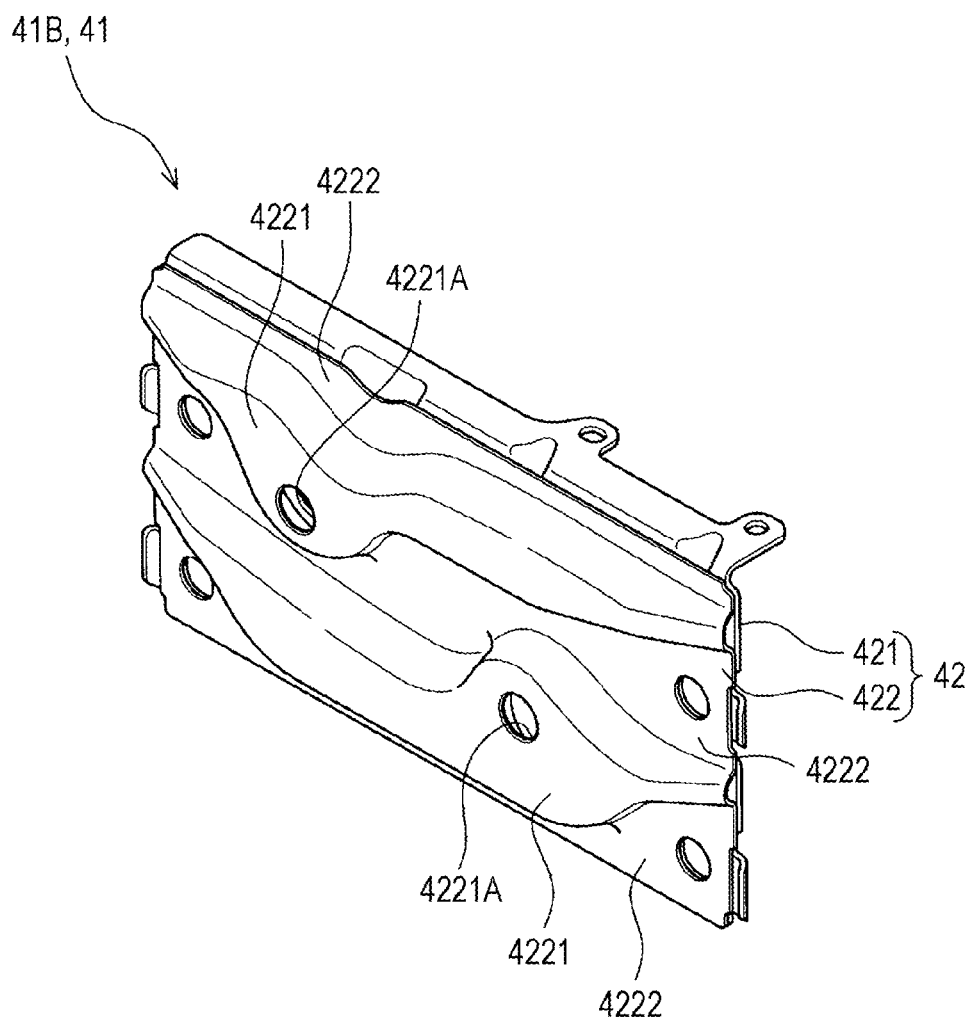
FIG. 10 is a perspective view of the other terminal member.
Figure 10:
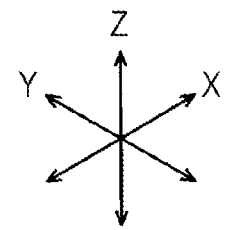

In this embodiment, positions corresponding to the protruding portions 223 of the terminal neighboring member 22 are positions where at least a portion of the protruding portion 223 overlaps with a projection region P1 of the shaft portion 432 in the X axis direction in a state where the shaft portion 432 of the bolt member 43 is made to pass through the shaft portion insertion hole 421A (see FIG. 5 and FIG. 6).

A profile of the second member 422 corresponds to a profile of the first member 421. That is, the second member 422 has a rectangular shape elongated in the Y axis direction as viewed in the X axis direction. The second member 422 has bulging portions 4221 which bulge inward (toward an energy storage device 10 side) with respect to the first member 421. The second member 422 also has flat portions 4222 extending along the first member 421.

The bulging portions 4221 extend in the Y axis direction. The bulging portions 4221 of this embodiment extend in the Y axis direction at positions corresponding to two shaft portion insertion holes 421A of the first member 421 in the Z axis direction. That is, the second member 422 has two bulging portions 4221 disposed in a spaced apart manner in the Z axis direction. In this embodiment, portions of the second member 422 other than the bulging portions 4221 form the flat portions 4222.

Each of two bulging portions 4221 has a protruding portion insertion hole 4221A which allows the protruding portion 223 of the terminal neighboring member 22 to pass therethrough. That is, the protruding portion insertion hole 4221A is formed at a position corresponding to the protruding portion 223 of the terminal neighboring member 22 (a position overlapping with the protruding portion 223 as viewed in the X axis direction). Further, the protruding portion insertion hole 4221A is formed at a position corresponding to the shaft portion insertion hole 421A of the first member 421. In this embodiment, the center of the protruding portion insertion hole 4221A is displaced in the Z axis direction (displaced downward in the example shown in FIG. 5 and FIG. 6) with respect to the center of the shaft portion insertion hole 421A. A displacement amount (displacement width) falls within a range where at least a portion of the protruding portion 223 inserted into the protruding portion insertion hole 4221A overlaps with the projection region P1 of the shaft portion 432 of the bolt member 43 inserted into the shaft portion insertion hole 421A in the X axis direction.

Each of two bulging portions 4221 is disposed at a position avoiding the protruding portion 223 which is disposed adjacently to the protruding portion 223 of the terminal neighboring member 22 which is inserted into the protruding portion insertion hole 4221A in the Y axis direction (that is, each of two bulging portions 4221 being formed into a shape avoiding the above-mentioned neighboring protruding portion 223). With such a configuration, with respect to one terminal member 41A, two protruding portions 223 disposed on one imaginary inclined line D1 of the second body portion 221 are respectively inserted into the protruding portion insertion holes 4221A of the corresponding bulging portions 4221, and two protruding portions 223 disposed on the other imaginary inclined line D2 of the second body portion 221 respectively face the flat portions 4222. On the other hand, with respect to the other terminal member 41B, two protruding portions 223 disposed on the other imaginary inclined line D2 of the second body portion 221 are respectively inserted into the protruding portion insertion holes 4221A of the corresponding bulging portions 4221, and two protruding portions 223 disposed on one imaginary inclined line D1 of the second body portion 221 respectively face the flat portions 4222.

The pair of terminal members 41 having the above-mentioned configuration is respectively disposed in a state where two bulging portions 4221 of the second member 422 are brought into contact with the outer surface 221A of the terminal neighboring member 22 (second body portion 221) (see FIG. 5 and FIG. 6).

As shown in FIG. 1 and FIG. 2, the pair of connecting members 45 is respectively disposed on both sides of the unit formed of the plurality of energy storage devices 10 in the Y axis direction. Each of the pair of connecting members 45 has: a pair of beam portions 450 which extend in the X axis direction and are disposed in a spaced apart manner in the Z axis direction; a pair of end portion connecting portions 451 which connects end portions of the pair of beam portions 450 to each other; and intermediate portion connecting portions 452 which connect the pair of beam portions 450 to each other at intermediate portions in the X axis direction. The connecting member 45 of this embodiment has the plurality of intermediate portion connecting portions 452.

The insulators 6 have an insulating property. The insulators 6 are disposed between the connecting members 45 and the unit formed of the plurality of energy storage devices 10. To be more specific, the insulator 6 covers at least a region of the connecting member 45 which faces plurality of energy storage devices 10. With such a configuration, the insulators 6 provide insulation between the connecting members 45 and the plurality of energy storage devices 10.

The bus bar 8 is a plate-like member having conductivity made of metal or the like. The bus bar 8 makes the external terminals 14 of the energy storage devices 10 conductive to each other. In the energy storage apparatus 1, the plurality of bus bars 8 are provided (the number of bus bars 8 corresponding to the number of the plurality of energy storage devices 10). The plurality of bus bars 8 of this embodiment connect all of the plurality of energy storage devices 10 included in the energy storage apparatus 1 in series (or make all of the plurality of energy storage devices 10 conductive with each other).

When a force which acts about the axis of the shaft portion 432 of the bolt member 43 is applied to the shaft portion 432, the greater a distance from the shaft portion 432 (to be more specific, an axis of the shaft portion 432) in a direction orthogonal to the axial direction, the greater a force (a force generated by the force which acts about the axis of the shaft portion 432 such as a torque) applied to an engaging portion of the terminal neighboring member 22 which engages with the terminal member 41 (in an example of this embodiment, the protruding portion 223) becomes. However, according to the energy storage apparatus 1 of this embodiment, the protruding portion 223 of the terminal neighboring member 22 is inserted into the body 42 of the terminal member 41 at the position where at least a portion of the protruding portion 223 of the terminal neighboring member 22 overlaps with the projection region of the shaft portion 432 in the X axis direction and hence, the distance (the distance from the shaft portion 432 (axis) in the direction orthogonal to the X axis direction) becomes sufficiently small. Accordingly, it is possible to suppress a force applied from the terminal member 41 to the protruding portion 223 (a portion of the terminal neighboring member 22 engaged with the terminal member 41) when a force which acts about the axis of the shaft portion 432 of the bolt member 43 is applied to the shaft portion 432.

In the energy storage apparatus 1 of this embodiment, the terminal member 41 has the first member 421 having the shaft portion insertion holes 421A which allow the bolt members 43 to pass therethrough, and the second member 422 which is disposed in a spaced apart manner from the first member 421 in the X axis direction such that the head portions 431 are positioned between the first member 421 and the second member 422 within regions where the second member 422 overlaps with at least the head portions 431 as viewed in the X axis direction (axial direction).

In this manner, the terminal member 41 has the duplicate structure at least partially (in the regions which overlap with the head portions 431 of the bolt members 43 as viewed in the X axis direction) and hence, a strength of the terminal member 41 can be sufficiently ensured. Further, the protruding portions 223 are inserted into the second member 422 disposed at the positions different from the bolt members 43 (head portions 431) in the terminal member 41, (that is, unlike the case shown in FIG. 11, it is unnecessary to insert the protruding portions 223 into the terminal member 41 by way of the bolt members 43) and hence, a shape or the like of the protruding portion 223 can be set without receiving the restriction on a shape or the like of the bolt member 43. That is, it is possible to ensure a large degree of freedom in designing the shape or the like of the protruding portion 223.

Further, in the energy storage apparatus 1 of this embodiment, by providing a distance between the first member 421 and the second member 422 and by positioning the head portion 431 of the bolt member 43 in the distance, the head portion 431 of the bolt member 43 does not obstruct the arrangement of the terminal neighboring member 22 with respect to the terminal member 41.

It is needless to say that the energy storage apparatus of the present invention is not limited to the above-mentioned embodiment, and various modifications are conceivable without departing from the gist of the present invention. For example, to the configuration of one embodiment, the configuration of another embodiment may be added. Alternatively, a part of the configuration of one embodiment may be replaced with the configuration of another embodiment. Further, a part of the configuration of one embodiment may be omitted.

In the terminal member 41 of the above-mentioned embodiment, the portion in which the protruding portion 223 of the terminal neighboring member 22 is inserted is the hole (protruding portion insertion hole 4221A) formed in the second member 422. However, the present invention is not limited to such a configuration. The portion of the terminal member 41 into which the protruding portion 223 is inserted may be a recessed portion (protruding portion insertion recessed portion). That is, it is sufficient that the positioning of the terminal neighboring member 22 with respect to the terminal member 41 can be performed by the insertion of the protruding portion 223. In the example shown in FIG. 11, the protruding portion insertion recessed portion 431A is formed on the head portion 431 of the bolt member 43, and the protruding portion 223 of the terminal neighboring member 22 is inserted into the protruding portion insertion recessed portion 431A. However, the protruding portion insertion recessed portion 431A or the like may be formed on the second member 422 or other members (members other than the first member 421 and the second member 422).

In the energy storage apparatus 1 according to the above-mentioned embodiment, the protruding portions 223 are formed on the terminal neighboring member 22, and the protruding portion insertion holes 4221A are formed in the terminal member 41. However, the present invention is not limited to such a configuration. For example, protruding portions (engaging portions between the terminal member 41 and the terminal neighboring member 22) may be formed on the terminal member 41, and protruding portion insertion holes or protruding portion insertion recessed portions into which the protruding portions are inserted may be formed on the terminal neighboring member 22.

In the terminal member 41 of the above-mentioned embodiment, the second member 422 has the bulging portions 4221 and the flat portions 4222. However, the present invention is not limited to such a configuration. The second member 422 may have only the bulging portion 4221. Also with such a configuration, a strength of the terminal member 41 can be sufficiently ensured.

In the terminal member 41 of the above-mentioned embodiment, the portions where the first member 421 and the second member 422 are spaced apart from each other in the X axis direction are partially formed (at only portions where the bulging portions 4221 are formed). However, the present invention is not limited to such a configuration. The first member 421 and the second member 422 may be configured such that the first member 421 and the second member 422 are spaced apart from each other in the X axis direction substantially over the whole area (substantially whole region) in the Y-Z plane direction.

Figure 11:
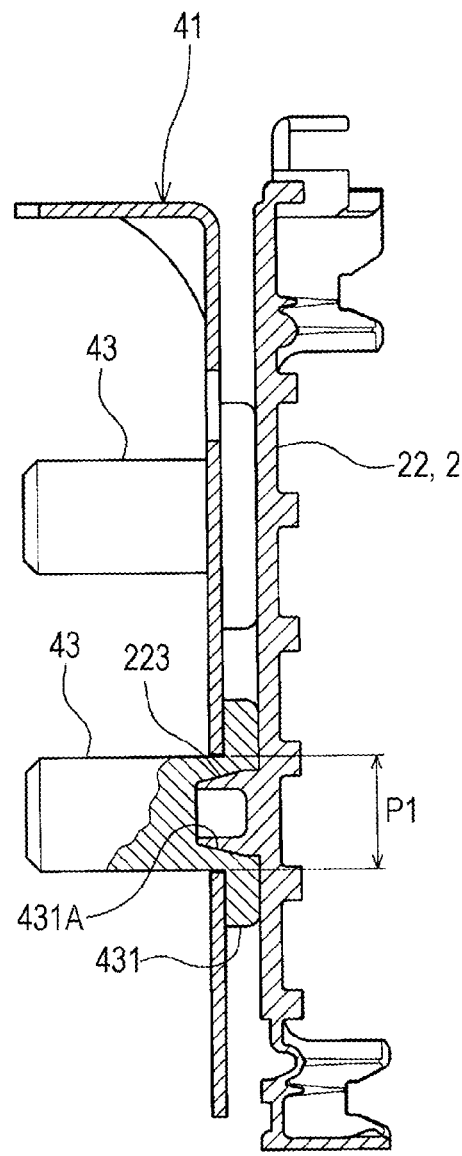
FIG. 11 is a cross-sectional view of a terminal member and a terminal neighboring member of an energy storage apparatus according to another embodiment.
Figure 11:
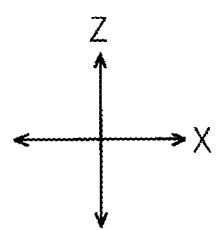

The terminal member 41 of the above-mentioned embodiment has the duplicate structure where the first member 421 and the second member 422 overlap with each other in the X axis direction. However, the present invention is not limited to such a configuration. The terminal member 41 may be formed of one member. In this case, for example, as shown in FIG. 11, the protruding portion insertion recessed portion 431A may be formed on the head portion 431 and the shaft portion 432 of the bolt member 43, and the protruding portion 223 of the terminal neighboring member 22 may be inserted into the protruding portion insertion recessed portion 431A. Also with such a configuration, the protruding portion 223 of the terminal neighboring member 22 is inserted into the terminal member 41 (body 42) at the position where at least a portion of the protruding portion 223 overlaps with the projection region P1 of the shaft portion 432 in the X axis direction.

Although the number of bolt members 43 disposed on the terminal member 41 in the above-mentioned embodiment is two, the number of bolt member 43 may be set to one or three or more. In this case, it is not necessary to form a portion into which the protruding portion 223 is inserted at positions of the terminal member 41 overlapping with the shaft portions 432 of all bolt members 43 as viewed in the X axis direction. It is sufficient to form at least one portion as the portion into which the protruding portion 223 is inserted.

The terminal member 41 of the above-mentioned embodiment is configured such that the shaft portions 432 protrude from the body 42 of the terminal member 41 by inserting the bolt members 43 into the first member 421. However, the present invention is not limited to such a configuration. For example, the configuration may be adopted where the shaft portions protrude from the body 42 of the terminal member 41 by connecting the shaft portions (members corresponding to the shaft portions 432 of the bolt members 43) extending in the X axis direction to the first member 421 by welding or the like.

Further, in the above-mentioned embodiment, the description has been made with respect to the case where the energy storage device is used as a nonaqueous electrolyte secondary battery (for example, lithium ion secondary battery) which can charge electricity and discharge electricity. However, a kind, a size (a capacity) of the energy storage device can be arbitrarily set. Further, in the above-mentioned embodiment, the description has been made with respect to the lithium ion secondary battery as one example of the energy storage device. However, the energy storage device is not limited to the lithium ion secondary battery. For example, the present invention is also applicable to an energy storage device for various secondary batteries, a primary battery, and a capacitor such as an electric double-layered capacitor.

What is claimed is:

1. An energy storage apparatus, comprising:
a neighboring member disposed adjacently to an energy storage device; and
a terminal member disposed adjacently to the neighboring member on a side opposite to the energy storage device,
wherein the terminal member includes:
a body extending along the neighboring member; and
a shaft portion protruding from the body toward a side opposite to the neighboring member,
wherein the neighboring member includes a protruding portion protruding in an axial direction of the shaft portion,
wherein the protruding portion is inserted into the body or the neighboring member at a position where at least a portion of the protruding portion overlaps with a projection region of the shaft portion in the axial direction,
wherein the body includes:
a first portion on which the shaft portion is mounted: and
a second portion disposed in a spaced apart manner from the first portion in the axial direction in a region which overlaps with at least the shaft portion as viewed in the axial direction, and
wherein, a head of the shaft portion is located between the first portion and the second portion.

2. The energy storage apparatus according to claim 1, wherein the second portion includes a protruding portion insertion hole or a protruding portion insertion recessed portion into which the protruding portion is inserted.

3. The energy storage apparatus according to claim 2, further comprising a bolt member including the head and the shaft portion extending from the head, and mounted on the first portion in a state where the shaft portion is configured to pass through the body from the neighboring member side,
wherein the second portion is disposed in a spaced apart manner from the first portion in the axial direction such that the head is positioned between the first portion and the second portion.

4. The energy storage apparatus according to claim 1, wherein the protruding portion is cylindrical.

5. The energy storage apparatus according to claim 1, wherein the protruding portion has a bottomed cylindrical shape.

6. The energy storage apparatus according to claim 1, wherein the protruding portion includes a peripheral surface including a proximal portion having a circular columnar surface.

7. The energy storage apparatus according to claim 6, wherein the protruding portion includes a tapered portion, a diameter of the tapered portion decreasing toward a distal end of the protruding portion, and
  wherein the diameter of the tapered portion decreases from the proximal portion to the distal end of the protruding portion.

8. The energy storage apparatus according to claim 6, wherein the diameter of the tapered portion continuously decreases from the proximal portion to the distal end of the protruding portion.

9. The energy storage apparatus according to claim 1, wherein a center of the protruding portion is displaced with respect to a center of the shaft portion as viewed in the axial direction.

10. The energy storage apparatus according to claim 1, wherein the protruding portion is disposed in a spaced apart manner from the first portion in the axial direction.

11. The energy storage apparatus according to claim 1,
  wherein the body includes a portion on which the shaft portion is mounted, and
  wherein the protruding portion is disposed in a spaced apart manner from the portion of the body in the axial direction.

12. The energy storage apparatus according to claim 1, wherein the protruding portion is inserted into the body.

13. An energy storage apparatus, comprising:
  a neighboring member disposed adjacently to an energy storage device; and
  a terminal member disposed adjacently to the neighboring member on a side opposite to the energy storage device,
  wherein the terminal member includes:
    a body extending along the neighboring member; and
    a shaft portion protruding from the body toward a side opposite to the neighboring member,
  wherein the neighboring member includes a protruding portion protruding in an axial direction of the shaft portion,
  wherein the protruding portion is inserted into the body at a position where at least a portion of the protruding portion overlaps with a. projection region of the shaft portion in the axial direction,
  wherein the body includes:
    a first portion on which the shaft portion is mounted; and
    a second portion disposed in a spaced apart manner from the first portion in the axial direction in a region which overlaps with at least the shaft portion as viewed in the axial direction,
  wherein the protruding portion is disposed in a spaced apart manner from the first portion in the axial direction, and
  wherein a head of the shaft portion is located between the first portion and the second portion.

14. The energy storage apparatus according to claim 13, wherein the protruding portion includes a tapered portion, a diameter of the tapered portion decreasing toward a distal end of the protruding portion.

15. The energy storage apparatus according to claim 13, wherein the protruding portion is cylindrical and includes a peripheral surface including a proximal portion having a circular columnar surface.

16. The energy storage apparatus according to claim 15, wherein the protruding portion further includes a tapered portion, a diameter of the tapered portion, decreasing from the proximal portion to a distal end of the protruding portion.

17. An energy storage apparatus, comprising:
  a neighboring member disposed adjacently to an energy storage device, the energy storage device including an external terminal protruding in a first direction; and
  a terminal member disposed adjacently to the neighboring member on a side opposite to the energy storage device,
  wherein the terminal member includes:
    a body extending along the neighboring member; and
    a shaft portion protruding from the body toward a side opposite to the neighboring member,
  wherein the neighboring member includes a protruding portion protruding in an axial direction of the shaft portion,
  wherein the protruding portion is inserted into the body at a position where at least a portion of the protruding portion overlaps with a projection region of the shaft portion in the axial direction,
  wherein a center of the protruding portion is displaced with respect to a center of the shaft portion as viewed in the axial direction,
  wherein the protruding portion includes first and second protruding portions which do not overlap with each other when viewed in a second direction perpendicular to the first direction and the axial direction,
  wherein the body includes:
    a first portion on which the shaft portion is mounted; and
    a second portion disposed in a spaced apart manner from the first portion in the axial direction in a region which overlaps with at least the shaft Portion as viewed in the axial direction,
  wherein the second portion includes a protruding portion insertion hole or a protruding portion insertion recessed portion into which the protruding portion is inserted, and
  wherein a head of the shaft portion is located between the first portion and the second portion.

18. The energy storage apparatus according to claim 17, wherein the protruding portion is cylindrical and includes a tapered portion, a diameter of the tapered portion decreasing from a proximal portion of the protruding portion to a distal end of the protruding portion.

19. The energy storage apparatus according to claim 13, wherein the second portion includes a bulging portion which bulges toward the neighboring member, and
  wherein, when viewed in the axial direction, a shape of the bulging portion is different on opposing sides of a centerline of the second portion, the centerline extending on the second portion in a direction that an external terminal protrudes from the energy storagee device.

20. The energy storage apparatus according to claim 1, wherein, between the first portion and the second portion, a surface of the head of the shaft portion abuts a surface of the first portion, and
  wherein, in a radial direction of the shaft portion, the surface of the head of the shaft portion protrudes from a body portion of the shaft portion that passed through the first portion.

* * * * *